United States Patent
Shijo

[11] Patent Number: 6,123,866
[45] Date of Patent: Sep. 26, 2000

[54] ELECTROLYTIC SOLUTION FOR CLINOMETRIC SENSOR

[75] Inventor: Yoshihisa Shijo, Tokyo, Japan

[73] Assignee: Asahi Kogaku Kogyo Kabushiki Kaisha, Tokyo, Japan

[21] Appl. No.: 09/078,135

[22] Filed: May 14, 1998

[30] Foreign Application Priority Data

May 14, 1997 [JP] Japan .................................... 9-124019

[51] Int. Cl.⁷ .............................. G01C 9/06; G01C 15/10
[52] U.S. Cl. ................ 252/62.2; 33/366.21; 33/366.15; 33/366.18; 33/366.19
[58] Field of Search ........................... 252/62.2; 429/326, 429/339, 341; 33/366.21, 366.15, 366.18, 366.19; 361/304, 305

[56] References Cited

U.S. PATENT DOCUMENTS

| | | | |
|---|---|---|---|
| 3,658,592 | 4/1972 | Dey | 429/339 |
| 3,829,330 | 8/1974 | Dey | 429/339 |
| 4,937,518 | 6/1990 | Donati et al. | |

FOREIGN PATENT DOCUMENTS 7-146142  6/1995  Japan .

*Primary Examiner*—C. Melissa Koslow
*Attorney, Agent, or Firm*—Greenblum & Bernstein, P.L.C.

[57] ABSTRACT

A pair of upper electrodes are formed on an upper inner surface of a closed container constituting a clinometric sensor and a lower electrode is formed on the bottom of the closed container. An electrolytic solution comprising potassium iodide and a solvent containing a mixture of N,N-dimethylformamide and acetonitrile in which a bubble remains is sealed into the closed container.

16 Claims, 3 Drawing Sheets

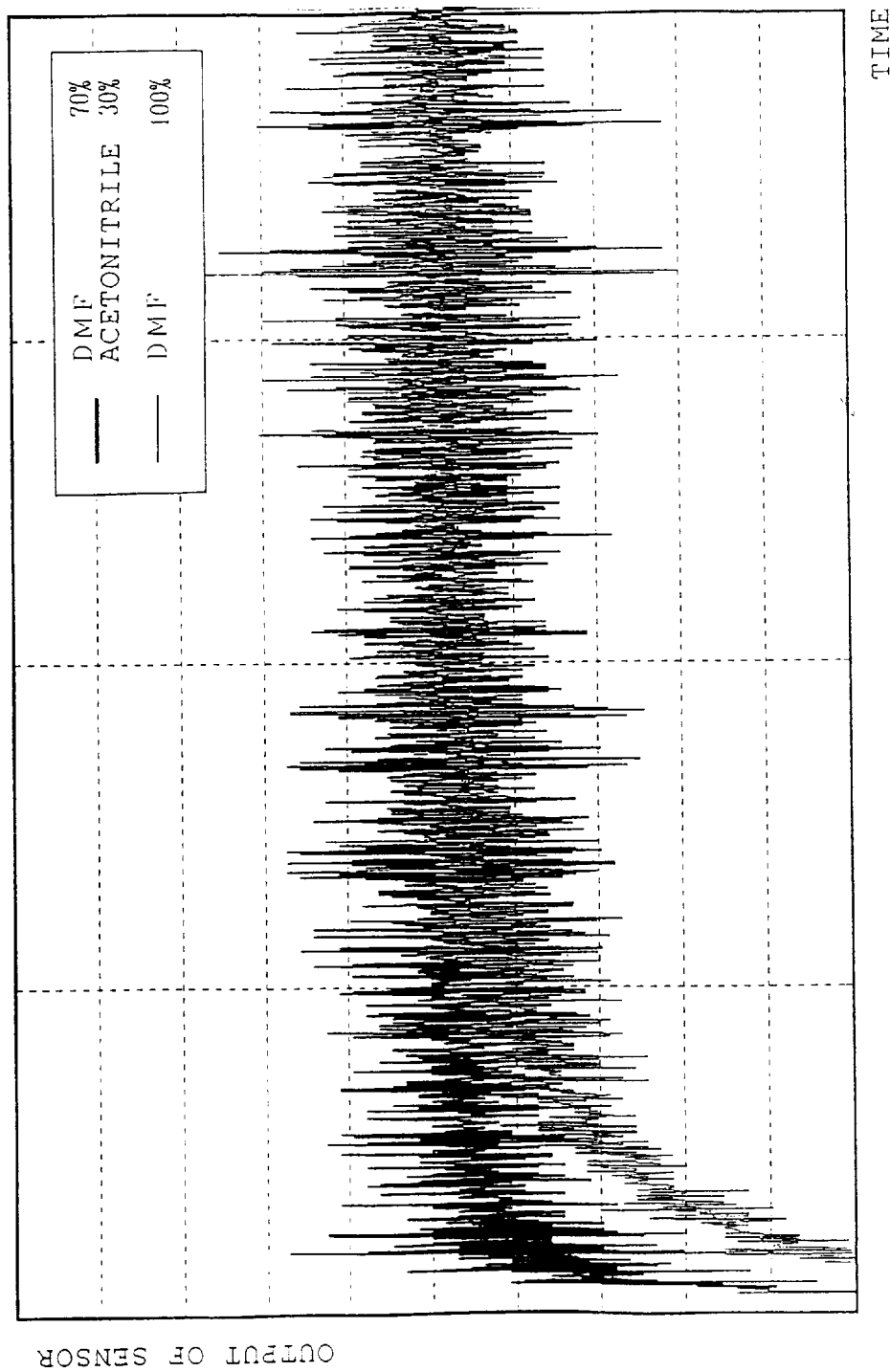

ELECTROLYTIC SOLUTION FOR CLINOMETRIC SENSOR

BACKGROUND OF THE INVENTION

1. Field of the Invention

This invention relates to an electrolytic solution for a clinometric sensor and, particularly, to an electrolytic solution sealed into a closed container of a clinometric sensor of potentiometric type. The present disclosure related to subject matter contained in Japanese Patent Application No. 9-124019 (filed on May 14, 1997), which is expressly incorporated herein by reference in its entirety.

2. Description of the Related Art

Conventionally, a clinometric sensor detecting the position of a bubble remaining in a liquid sealed into a closed container is used to detect the inclination of surveying equipment, aircraft, automobiles, and so on. As one of such a clinometric sensor, a potentiometric type is known in which an electrolytic solution is used as the liquid sealed into the closed container and which detects the position of a bubble by measuring variations in the resistance of the electrolytic solution.

In the clinometric sensor of potentiometric type, a pair of upper electrodes are formed on the upper inner surface of the closed container and a common electrode is formed on the bottom surface of the container. Constant voltages are applied between each of the upper electrodes and the common electrode. In this condition, when the closed container inclines to the direction in which detection of the angle of inclination is to be executed, the position of the bubble varies, so that the contact area of the electrolytic solution with the upper electrodes varies. This causes variations in the resistances between each of the upper electrodes and the common electrode whereby the ratio of the currents flowing through each of the upper electrodes is varied. This ratio of the currents is detected by a detecting circuit as a signal indicating the angle of inclination of the closed container. In this manner, the angle of inclination of the subject for measurement to which the clinometric sensor is attached can be measured.

Solvents used as the electrolytic solution for the clinometric sensor are, in turn, two types including a methanol-based type and N,N-dimethylformamide (DMF) based type. The methanol-based solvent is, for example, a mixture of methanol and water, and so on. The DMF-based solvent is, for example, a mixture of DMF and nPA (n-propanol), and so on.

The above solvents used as the electrolytic solution for the clinometric sensor however have the following drawbacks: Specifically, the DMF-based solvent has a viscosity higher than that of the methanol-based solvent and therefore it will take time for a bubble in an electrolytic solution to move. The use of the DMF-based solvent therefore gives rise to the problem wherein the response characteristics of the clinometric sensor (the speed of response of output to the angle of inclination when the clinometric sensor is inclined) is impaired.

On the other hand, the methanol-based solvent is lower in viscosity than the DMF-based solvent and hence has an advantage that the response characteristics of the clinometric sensor is higher than in the case of using the DMF-based solvent. However, it is known that some combinations of methanol and a halogenated compound (for example, KI and KCl) used as an electrolyte dissolve platinum and gold used as electrode materials though it depends on the sorts of halogenated compound. The use of the methanol-based solvent has the possibility of dissociation of electrodes. Also, when the methanol-based solvent is used, there is the case where the output of the clinometric sensor becomes unstable in a high temperature condition (at temperatures higher than 50° C.).

SUMMARY OF THE INVENTION

The present invention has been conducted in view of this situation and has an object of providing an electrolytic solution for a clinometric sensor which can improve the response characteristics of the clinometric sensor, restrain the potential of electrode elution, and stabilize the output of the clinometric sensor in a given temperature condition.

According to a first aspect of the present invention in order to solve the above-mentioned problems, there is provided an electrolytic solution for clinometric sensor which is sealed into a closed container of a clinometric sensor of potentiometric type comprising a solvent containing a mixture of N,N-dimethylformamide and acetonitrile.

According to the first aspect of the present invention, in which the solvent is prepared by blending N,N-dimethylformamide having a relatively high viscosity and acetonitrile having a relatively low viscosity, the resulting solvent has a viscosity lower than a solvent containing singly N,N-dimethylformamide. Therefore, the movement of a bubble sealed into a closed container of the clinometric sensor can be promoted thereby improving the response characteristics of the clinometric sensor.

According to a second aspect of the present invention, there is provided an electrolytic solution for clinometric sensor comprising a solvent composed of a liquid mixture of N,N-dimethylformamide and acetonitrile at a ratio by weight of 99:1 to 1:99.

If the ratio by weight is in the above defined range, the response characteristics of the clinometric sensor can be sufficiently improved. However, acetonitrile has a coefficient of thermal expansion larger than that of methanol. Accordingly, if the ratio by weight of acetonitrile exceeds the above-mentioned range, the size of a bubble sealed into a closed container of the clinometric sensor may tend to vary as the temperature varies though the response characteristics of the clinometric sensor is improved. On the contrary, if the ratio by weight of acetonitrile is less than the lower limit of the above defined range, the response characteristics of the clinometric sensor may tend to be impaired.

Furthermore, N,N-dimethylformamide (DMF) is naturally decomposed by light. Accordingly, if the percentage by weight of acetonitrile is designed to be greater than that of DMF within the above defined range, the proportion of DMF contained in the solvent can be restrained. As a result, the influence of deterioration of the electrolytic solution caused by photolysis of DMF can be reduced. Yet, even if the percentage by weight of DMF is greater than that of acetonitrile, the composite can be used as an adequate electrolytic solution for the clinometric sensor when the closed container of the clinometric sensor is provided with a light shielding structure.

According to a third aspect of the present invention, there is provided an electrolytic solution for clinometric sensor which is sealed into a closed container of a clinometric sensor of potentiometric type comprising a solvent containing a mixture of methanol and acetonitrile.

According to the third aspect of the present invention, in which acetonitrile having a viscosity lower than that of methanol is mixed with methanol, the viscosity of the solvent can be almost the same as or lower than that of methanol. Also, the content of methanol in the solvent can be reduced by the content of acetonitrile. Therefore, the response characteristics of the clinometric sensor can be maintained and improved. Also, the possibility of dissolution of the electrodes in the closed container of the clinometric sensor can be reduced.

According to a fourth aspect of the present invention, there is provided an electrolytic solution for clinometric sensor comprising a solvent composed of a liquid mixture of methanol and acetonitrile in a ratio by weight of 99:1 to 1:99.

If the ratio by weight is in the above defined range, the effects produced by blending methanol and acetonitrile can be obtained. However, acetonitrile has a coefficient of thermal expansion larger than that of methanol as above-mentioned. Accordingly, if the ratio by weight of acetonitrile exceeds the above range, the size of a bubble sealed into a closed container of the clinometric sensor may tend to vary as variations in temperature. On the contrary, if the ratio by weight of acetonitrile is less than the lower limit of the above defined range, the possibility of dissolution of the electrodes may be increased by methanol.

The preferred range of percentage by weight of the acetonitrile in the electrolytic solution, i.e., a mixture containing N,N-dimethylformamide and acetonitrile or a mixture containing methanol and acetonitrile, is equal to or greater than 10%, more preferably the acetonitrile is present at about 20–40 percent by weight of the electrolytic solution, with a preferred percentage by weight of the acetonitrile in the electrolytic solution being about 30%.

The electrolytic solution of the present invention can include an electrolyte. The electrolyte can include a halogenated compound including at least one of potassium iodide and potassium chloride.

BRIEF DESCRIPTION OF THE DRAWINGS

The invention will be described below in detail with reference to the accompanying drawings, in which:

FIG. 2 is a graph showing the response characteristics of a clinometric sensor.

DESCRIPTION OF THE PREFERRED EMBODIMENT

The preferred embodiments of the present invention will now be explained in detail.

EXAMPLE 1

In example 1, N,N-dimethylformamide (DMF) and acetonitrile were mixed in a ratio by weight [%] of 7:3 to prepare a solvent. Potassium iodide (KI), in an amount of 0.4 gram and at 0.3 weight percent, was dissolved as an electrolyte in this solvent to produce an electrolytic solution for a clinometric sensor.

The viscosity [cP] of the electrolytic solution is shown in Table 1 as contrasted with those of formation as the solvent. In Table 1, each viscosity of the formations of a single component is based on literature and electrolytic solutions prepared in Example 1 and solvents prepared from two components are based on actual measurements. Also, the ratios in two compositions are each shown by the ratio by weight [%] and each viscosity was measured at 20° C. to 25° C.

TABLE 1

| Material | Viscosity [cP] |
| --- | --- |
| DMF | 0.802 |
| n-PA | 2.26 |
| Methanol | 0.595 |
| Acetonitrile | 0.341 |
| Water | 1.00 |
| DMF:acetonitrile (including an electrolyte) 7:3 | 0.66 |
| DMF:n-PA (including an electrolyte) 7:3 | 1.00 |
| Methanol:Acetonitrile 7:3 | 0.44 |
| Methanol:Water 1:9 | 0.88 |
| Methanol:Water 2:8 | 1.15 |
| Methanol:Water 3:7 | 1.36 |

The table 1 shows that the electrolytic solution prepared in Example 1 has a viscosity lower than that of single DMF or an electrolytic solution composed of an electrolyte (potassium iodide) and a solvent prepared by blending DMF and n-PA in a ratio by weight of 7:3.

Figure 1:
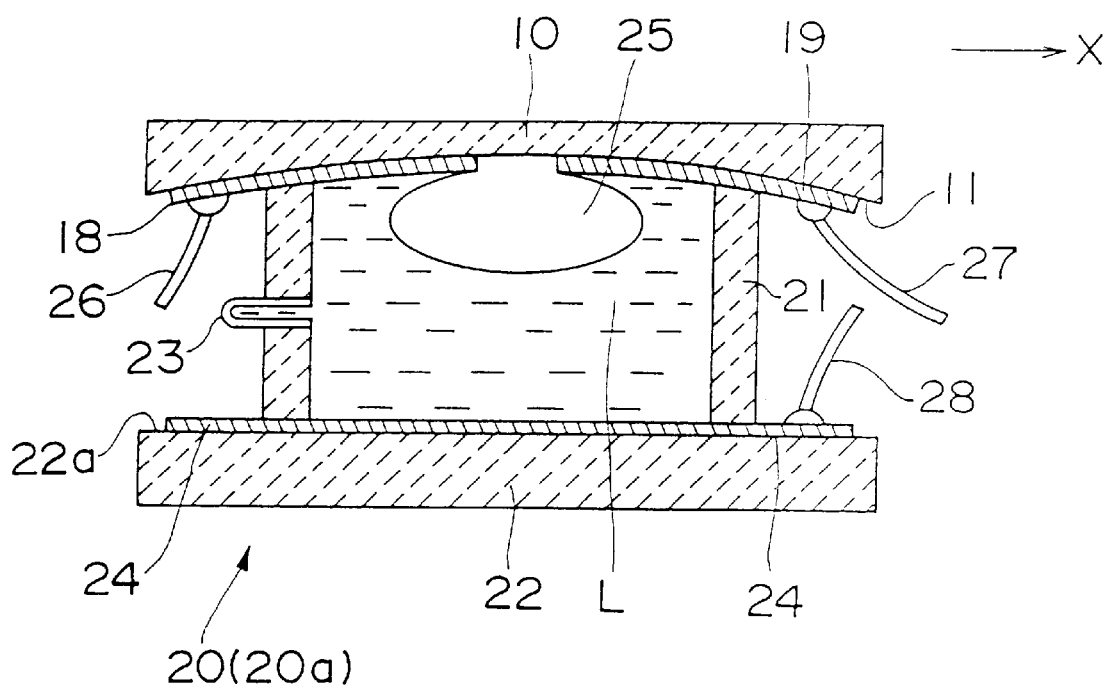
FIG. 1 is a longitudinal sectional view of a closed container of a clinometric sensor.

Next, a closed container for a clinometric sensor was prepared and the electrolytic solution (70% DMF, 30% acetonitrile, and an electrolyte) of Example 1 prepared in the above-mentioned manner was sealed into the closed container. FIG. 1 is a sectional view taken on the plane involving the axis and the line along the direction (X direction of FIG. 1) in which detecting of the angle of inclination is to be executed showing the closed container of a clinometric sensor. In FIG. 1, a closed container 20 comprises a ceiling 10, a cylindrical material 21, and a bottom plate 22.

The ceiling 10 is in the form of a circular plate with one face 11 thereof being formed as a concave surface which is a spherical concave surface with the deepest portion coinciding with the center of the ceiling 10. Two upper electrodes 18 and 19 in the shape of the arcs of circles are formed at a certain interval (at a minimum width of the interval, that is gap, of 0.1 centimeters) on the concave surface 11. These upper electrodes 18, 19 are formed line-symmetric with respect to the line which passes through the center of the ceiling 10 and which is perpendicular to the direction in which detecting of the angle of inclination is to be executed and to the axis of the closed container. A pipe 23 through which the electrolytic solution L will be injected into the closed container is formed in the manner penetrating the side wall of the cylindrical material 21. The bottom plate 22 is in the form of a circular plate. A circular lower electrode (common electrode) 24 which is concentric with respect to the bottom plate 22 is formed on one plane 22a of the bottom plate 22.

This closed container 20 is assembled in such a manner that one end of the cylindrical material 21 is closed with the concave surface 11 of the ceiling 10 and the other end is closed with the plane 22a of the bottom plate 22. The electrolytic solution L prepared in Example 1 is injected into the closed container via the pipe 23 so that air remains within the closed container to form a bubble 25. The pipe 23 is closed whereby the electrolytic solution L is sealed into the closed container 20. Leads 26, 27, 28 through which voltage is applied between each of electrodes are connected to the upper electrodes 18, 19 and the lower electrode 24 respectively.

COMPARATIVE EXAMPLE

DMF was prepared in an amount equivalent to that of the above-mentioned electrolytic solvent L of Example 1. The same electrolyte (potassium iodide) as used in the electrolytic solution L of Example 1 was added to DMF to obtain an electrolytic solution (Comparative Example 1: 100% DMF and an electrolyte). In this Comparative Example 1, the amount of the electrolyte was the same as that of the electrolyte contained in the electrolytic solution L of Example 1. Then, the electrolytic solution prepared in the Comparative Example 1 was sealed into a closed container 20a which was similar to the closed container 20.

Next, these closed containers 20, 20a were arranged on the same horizontal plane in such a manner that these directions in which detecting of the angle of inclination is to be executed were of one accord. After this, these closed containers 20, 20a were simultaneously inclined at an optional angle to the direction in which detecting of the angle of inclination is to be executed and electric outputs from these closed containers 20, 20a were continuously measured to contrast the responsive characteristic of the both. The results of the measurements are shown in FIG. 2.

As shown in FIG. 2, the output of the electrolytic solution L (70% DMF, 30% acetonitrile, and an electrolyte) prepared in Example 1 reaches the steady state at a time earlier than in the case of the electrolytic solution prepared in Comparative Example 1 (100% DMF and an electrolyte). This shows that the electrolytic solution L prepared in Example 1 is superior in response characteristics to the electrolytic solution prepared in Comparative Example 1.

EXAMPLE 2

In Example 2, methanol and acetonitrile were blended in a ratio by weight [%] of 7:3 to prepare a solvent in which potassium iodide was dissolved as an electrolyte, thereby electrolytic solution for a clinometric sensor obtained.

COMPARATIVE EXAMPLE

Methanol and water were mixed in a ratio by weight [%] of 9:1 to prepare a solvent in which potassium iodide was dissolved as an electrolyte to produce an electrolytic solution (Comparative Example 2). In this Comparative Example 2, the amounts of the solvent and the electrolyte were as same as those used in the electrolytic solution of Example 2.

Next, two closed containers similar to the closed container 20 used in Example 1 were prepared. The electrolytic solutions prepared in Example 2 and Comparative Example 2 were sealed into these closed containers respectively. Then, these closed containers were inclined at an optional angle to the direction in which detecting of the angle of inclination is to be executed and voltages were applied across each of the upper electrodes 18, 19 and the lower electrode 24.

Figure 3A:
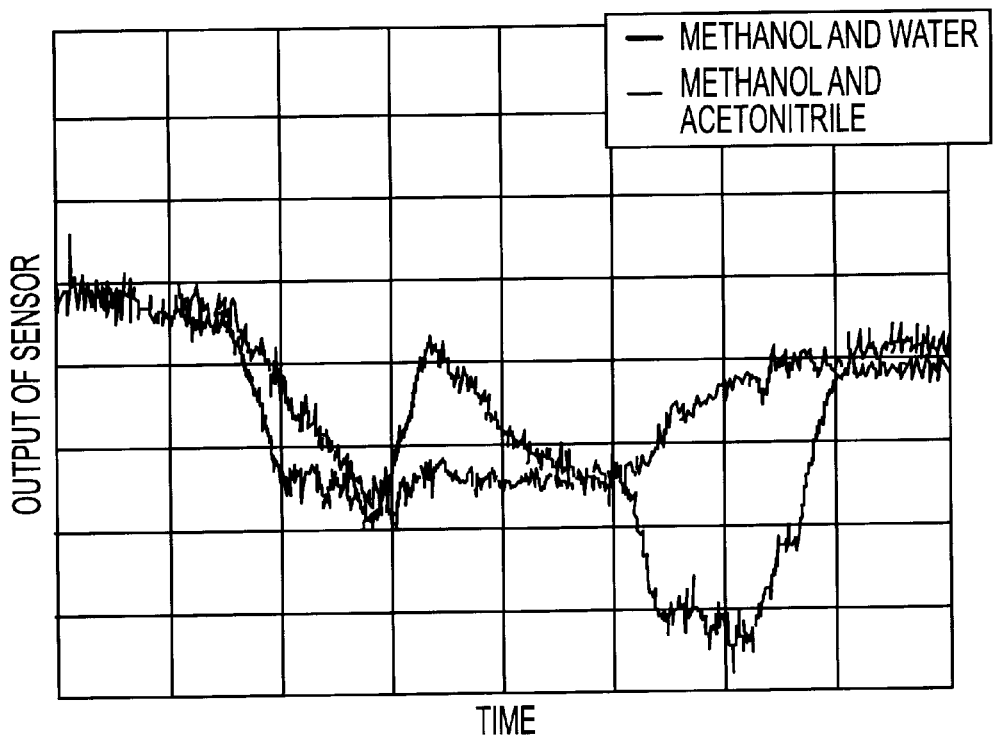
FIGS. 3(a) and 3(b) are graphs showing the relation between temperature and output of a clinometric sensor.
Figure 3B:
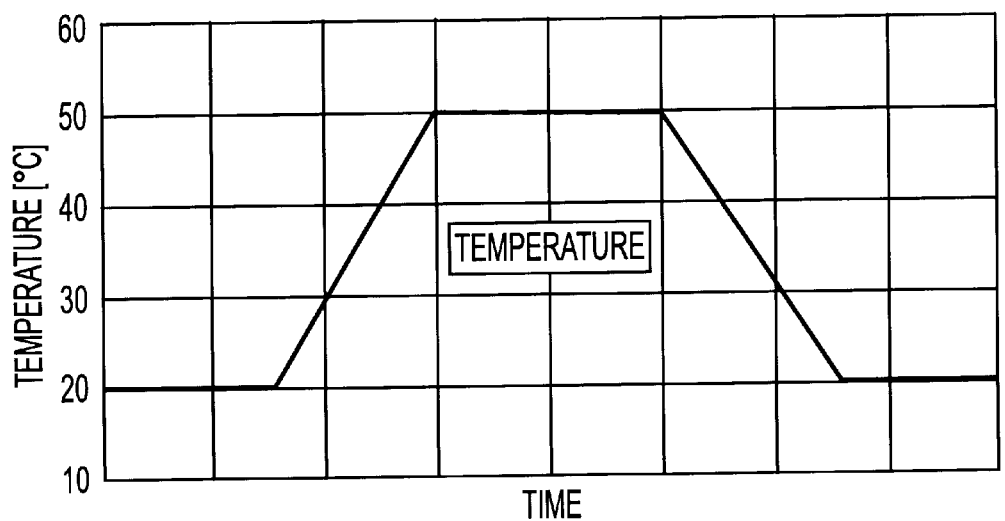

At this time, as shown in FIG. 3(b), the temperature was 20° C., these closed containers were allowed to stand in this condition for a while, and then the temperature was gradually raised to 50° C. These containers were then allowed to stand at a temperature of 50° C. for a while and the temperature was gradually lowered to 20° C. and was maintained. The outputs from each of these closed containers were continuously measured as the outputs of the corresponding clinometric sensors. The results of the measurements are shown in FIG. 3(a). The unit of time on the abscissa in FIGS. 3(a) and 3(b) is 10 seconds (10 seconds per grid).

As shown in FIG. 3(a), the output in the case of using the electrolytic solution (methanol, water, and an electrolyte) prepared in Comparative Example 2 was almost constant level in the initial condition of a temperature of 20° C. and rapidly decreased and was then maintained at a constant level in the stage of raising the temperature from 20° C. to 50° C. The output level rapidly increased and then gradually decreased in the condition of a temperature of 50° C. Also, in the stage of lowering the temperature from 50° C. to 20° C., the output level rapidly decreased, was then maintained almost constant, and then rapidly increased. When the temperature was 20° C. again, the output was maintained at a constant level. Thus, the electrolytic solution of Comparative Example 2 had the results of unstable output level in the condition of a temperature of 50° C.

On the other hand, the output level in the case of using the electrolytic solution (methanol, acetonitrile, and an electrolyte) prepared in Example 2 was maintained constant in the initial condition of a temperature of 20° C. and decreased with an increase in temperature in the stage of raising temperature from 20° C. to 50° C. A constant output level was maintained in the condition of a temperature of 50° C. Also, in the course of lowering the temperature from 50° C. to 20° C., the output level increased as the temperature decreased. Furthermore, the output was maintained at a constant level when the temperature was 20° C. again. As a result of the above experimentation, it was confirmed that the electrolytic solution prepared in Example 2 ensured that the output of the clinometric sensor was stable and almost constant in the condition of a temperature of 50° C. It was also confirmed that a stable output was obtained in the transitional conditions in which the temperature was raised from 20° C. to 50° C. and the temperature was lowered from 50° C. to 20° C.

In addition, the electrolytic solution (methanol, acetonitrile, and an electrolyte) prepared in Example 2 have, as shown in Table 1, a viscosity lower than that of the electrolytic solution (methanol, water, and an electrolyte) prepared in Comparative Example 2. Therefore the response characteristics of the clinometric sensor can be improved.

Furthermore, as shown in Table 1, the viscosity of the electrolytic solution prepared in Example 2 is lower than that of the electrolytic solution comprising a solvent consisting singly of methanol whereby the proportion of methanol in the electrolytic solution can be reduced without increase in viscosity. Therefore, the possibility in which the upper electrodes 18, 19 and the lower electrode 24 are dissolved by the electrolytic solution can be reduced.

According to the electrolytic solution for a clinometric sensor of the present invention, the response characteristics of the clinometric sensor can be improved. Also, the potential in which the electrodes formed in the closed container are dissolved can be limited. Furthermore, a stable output can be obtained in the prescribed temperature condition.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An electrolytic solution for a clinometric sensor which is sealed into a closed container of a clinometric sensor of potentiometric type comprising a solvent containing a mixture of N,N-dimethylformamide and acetonitrile, said acetonitrile being present at a percentage by weight of electrolytic solution of equal to or greater than 10%.

2. The electrolytic solution of claim 1, further comprising an electrolyte comprising a halogenated compound.

3. The electrolytic solution of claim 2, wherein said halogenated compound comprises at least one member selected from the group consisting of potassium iodide and potassium chloride.

4. The electrolytic solution of claim 1, wherein said acetonitrile is present at a percentage by weight of electrolytic solution of about 10–40%.

5. The electrolytic solution of claim 2, wherein said acetonitrile is present at a percentage by weight of electrolytic solution of about 30%.

6. An electrolytic solution for a clinometric sensor which is sealed into a closed container of a clinometric sensor of potentiometric type comprising a solvent containing a mixture of methanol and acetonitrile.

7. An electrolytic solution for a clinometric sensor according to claim 6, wherein said solvent is composed of a liquid mixture of methanol and acetonitrile in a ratio by weight of 99:1 to 1:99.

8. The electrolytic solution of claims 6, further comprising an electrolyte.

9. The electrolytic solution of claim 8, wherein said electrolyte comprises a halogenated compound.

10. The electrolytic solution of claim 9, wherein said halogenated compound comprises at least one member selected from the group consisting of potassium iodide and potassium chloride.

11. The electrolytic solution of claim 6, wherein said acetonitrile is present at a percentage by weight of electrolytic solution of equal to or greater than 10%.

12. The electrolytic solution of claim 11, wherein said acetonitrile is present at a percentage by weight of electrolytic solution of about 10–40%.

13. The electrolytic solution of claim 12, wherein said acetonitrile is present at a percentage by weight of electrolytic solution of about 30%.

14. A clinometric sensor comprising a closed container including electrodes and an electrolytic solution as recited in claim 1.

15. A clinometric sensor comprising a closed container including electrodes and an electrolytic solution as recited in claim 2.

16. A clinometric sensor comprising a closed container including electrodes and an electrolytic solution as recited in claim 8.

* * * * *